United States Patent
Hall et al.

(10) Patent No.: US 9,890,849 B1
(45) Date of Patent: Feb. 13, 2018

(54) ELECTRONIC SHIFTER WITH TACTILE FEEDBACK

(71) Applicants: David R. Hall, Provo, UT (US);
Stephen R. Hall, Draper, UT (US);
Christopher Johnson, Provo, UT (US);
Jason Simpson, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US)

( * ) Notice: Subject to any disclaimer, the term of this patent is extended or adjusted under 35 U.S.C. 154(b) by 0 days.

(21) Appl. No.: 15/287,006

(22) Filed: Oct. 6, 2016

(51) Int. Cl.
*G10K 7/06* (2006.01)
*F16H 59/04* (2006.01)
*F16H 59/02* (2006.01)
*G05G 5/04* (2006.01)
*G05G 5/03* (2008.04)
*G05G 5/05* (2006.01)
*G08B 6/00* (2006.01)

(52) U.S. Cl.
CPC ....... *F16H 59/044* (2013.01); *F16H 59/0204* (2013.01); *G05G 5/03* (2013.01); *G05G 5/04* (2013.01); *G05G 5/05* (2013.01); *G08B 6/00* (2013.01); *F16H 2059/0239* (2013.01); *F16H 2059/0295* (2013.01)

(58) Field of Classification Search
CPC ............... F16H 59/10; F16H 2059/026; Y10T 74/20098; B60K 20/02
USPC ..................................................... 340/407.1
See application file for complete search history.

(56) References Cited

U.S. PATENT DOCUMENTS

| | | | | | |
|---|---|---|---|---|---|
| 5,727,424 | A | * | 3/1998 | Brandewie | F16H 59/04 180/336 |
| 6,098,483 | A | * | 8/2000 | Syamoto | F16H 59/10 74/473.12 |
| 6,231,476 | B1 | * | 5/2001 | Reasoner | F16H 59/10 477/99 |
| 7,000,497 | B1 | * | 2/2006 | Campbell | F16H 59/0278 74/525 |
| 2004/0041689 | A1 | * | 3/2004 | DeBono | B60R 25/066 340/5.52 |
| 2013/0220051 | A1 | * | 8/2013 | Geberth | F16H 59/04 74/473.3 |
| 2016/0215875 | A1 | * | 7/2016 | Grennvall | F16H 59/0204 |
| 2016/0348784 | A1 | * | 12/2016 | Kato | F16H 59/0278 |

* cited by examiner

*Primary Examiner* — Fabricio R Murillo Garcia

(57) ABSTRACT

An electronic gear shifter is described herein that provides tactile feedback imitating the tactile feedback generated by a manual transmission shifter. The shifter includes a tactile feedback mechanism having a base, a pivot through the base, one or more springs coupled to the base, and first and second detents. The base rotates about the pivot, whereas the springs resist rotations of the base from, and return the base to, and equilibrium position. The first detent resists rotation of the base from the equilibrium position. The second detent resists further rotation of the base past the first detent and away from the equilibrium position. Rotation of the base past the first and second detents imitates manual transmission tactile feedback, and rotation of the base past the second detent also closes one or more of the electronic switches.

17 Claims, 6 Drawing Sheets

| Ref. # | Part |
|---|---|
| 204 | mounting plate |
| 203a | first set of cylinders |
| 203a1 | second set of spheres |
| 203a2 | closed end |
| 203a3 | open end |
| 203b | base plate |
| 203b1 | nut |
| 203b2 | pivot rod |
| 203b3 | circular opening |
| 203b4 | straight slot |
| 204a | cylinder opening |
| 204b | pivot opening |
| 204c | spacer opening |
| 204d | brackets |
| 205 | spacer |
| 206 | switch |
| 206a | body |
| 206b | arm |

US 9,890,849 B1

ELECTRONIC SHIFTER WITH TACTILE FEEDBACK

TECHNICAL FIELD

This invention relates generally to the field of automobiles and more specifically to automobile gear shifters.

BACKGROUND

Advances in automotive technology have brought historic convenience and luxury to a demanding consumer market. While the general trend of demand has been to refine and modernize, consumers have also begun indicating a desire for classic features melded with cutting-edge technology. Many manufacturers, such as Ford, General Motors, and Fiat Chrysler, have met this demand by simply slapping classic car names on modern cars that may, or may not, resemble the original. However, one manufacturer, Vanderhall Motor Company, has taken the molding of classic with modern to unprecedented heights. The Vanderhall Venice is one example: a modern, three-wheeled roadster with a body design reminiscent of early Formula 1 models. One of the challenges in building a modern vehicle that stirs up fond nostalgia in consumers is giving the impression the vehicle is rooted in classic design and functionality while still providing all the benefits of modern advances in technology. An example of this would be imitating the sound of an internal combustion engine in an electric vehicle. However, little has been done to give drivers the impression that driving a new, modern vehicle feels like driving a classic car for the first time off the lot. Thus, there is great room for development in this area.

SUMMARY OF THE INVENTION

A vehicle is described herein incorporating features that address the classic-modern design problems discussed above. The vehicle includes an electronic gear shifter that provides tactile feedback imitating the tactile feedback generated by a manual transmission shifter. The shifter includes a handle, one or more electronic switches that signal a vehicle transmission to shift gears, and a tactile feedback mechanism. The tactile feedback mechanism includes a base coupled to the handle, a pivot through the base, one or more springs coupled to the base, and first and second detents. The base rotates about the pivot, whereas the springs resist rotations of the base from, and return the base to, and equilibrium position. The first detent resists rotation of the base from the equilibrium position. The second detent resists further rotation of the base past the first detent and away from the equilibrium position. Rotation of the base past the first and second detents imitates manual transmission tactile feedback, and rotation of the base past the second detent also closes one or more of the electronic switches.

The benefits of the present invention are immediately realized by those of skill in the art. In particular, the dual-detent system gives a driver the impression he or she is driving a manual transmission vehicle, while still maintaining the precision of an electronically shifted transmission. As the base moves past the first detent, the driver feels a "bump" that gives the impression the transmission was disengaged from the current gear. As the base moves past the second detent, the driver feels a second "bump" that gives the impression the next gear is engaged.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1:
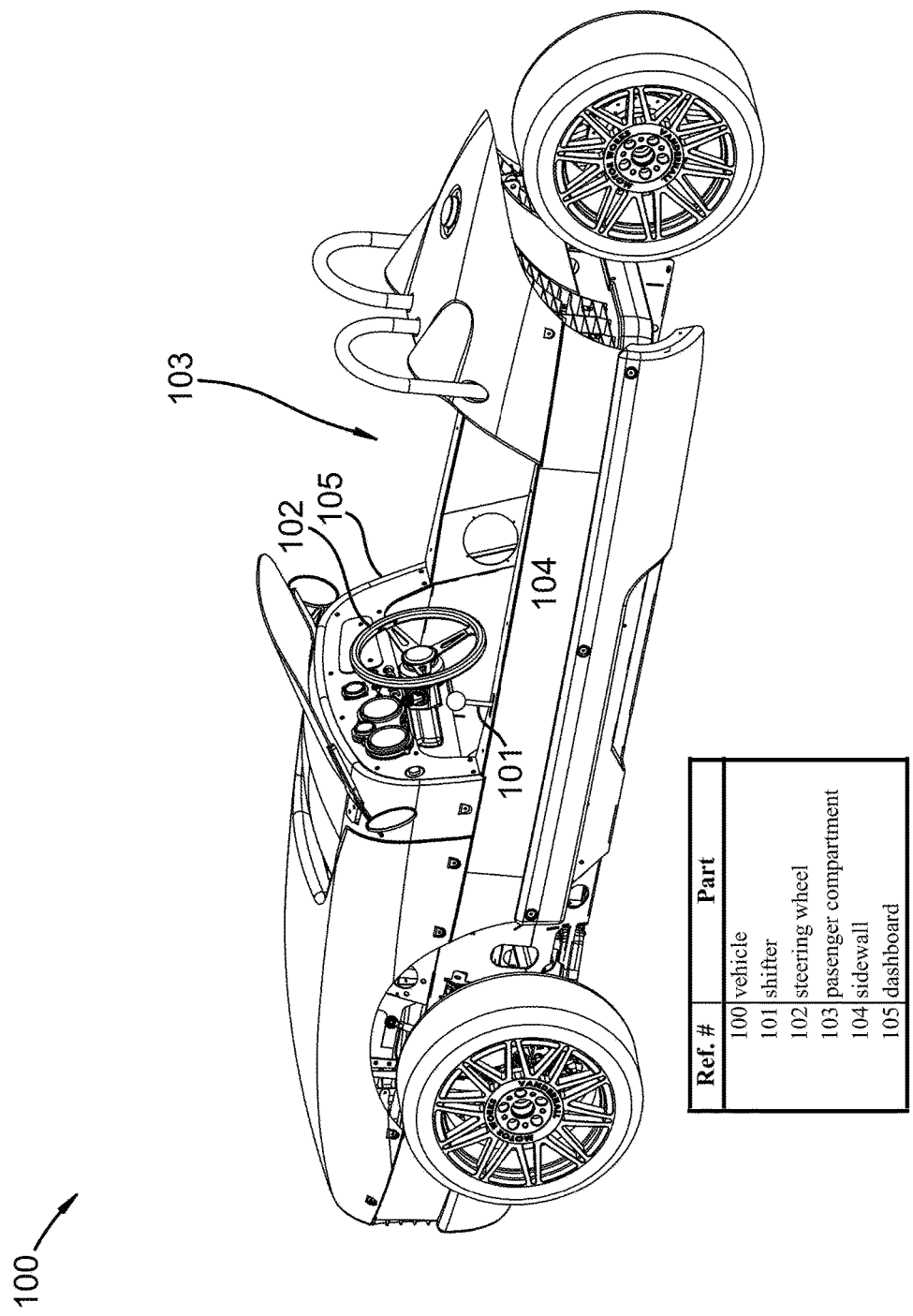
FIG. 1 depicts an embodiment of a vehicle incorporating an electronic shifter according to the present invention.
Figure 2A:
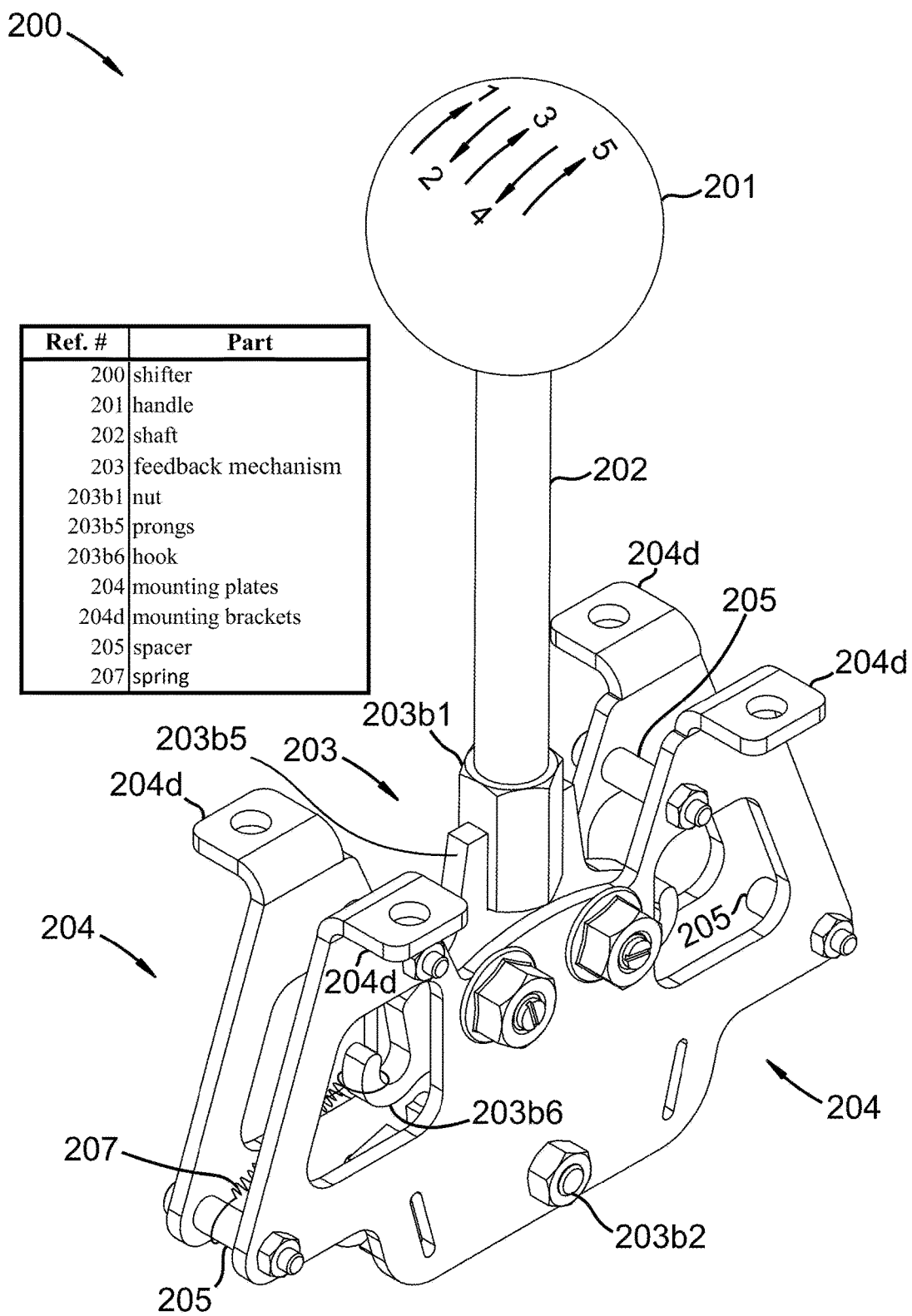
FIGS. 2A-E depict various views of one embodiment of a manual-feel electronic shifter according to the claimed invention.
Figure 2B:
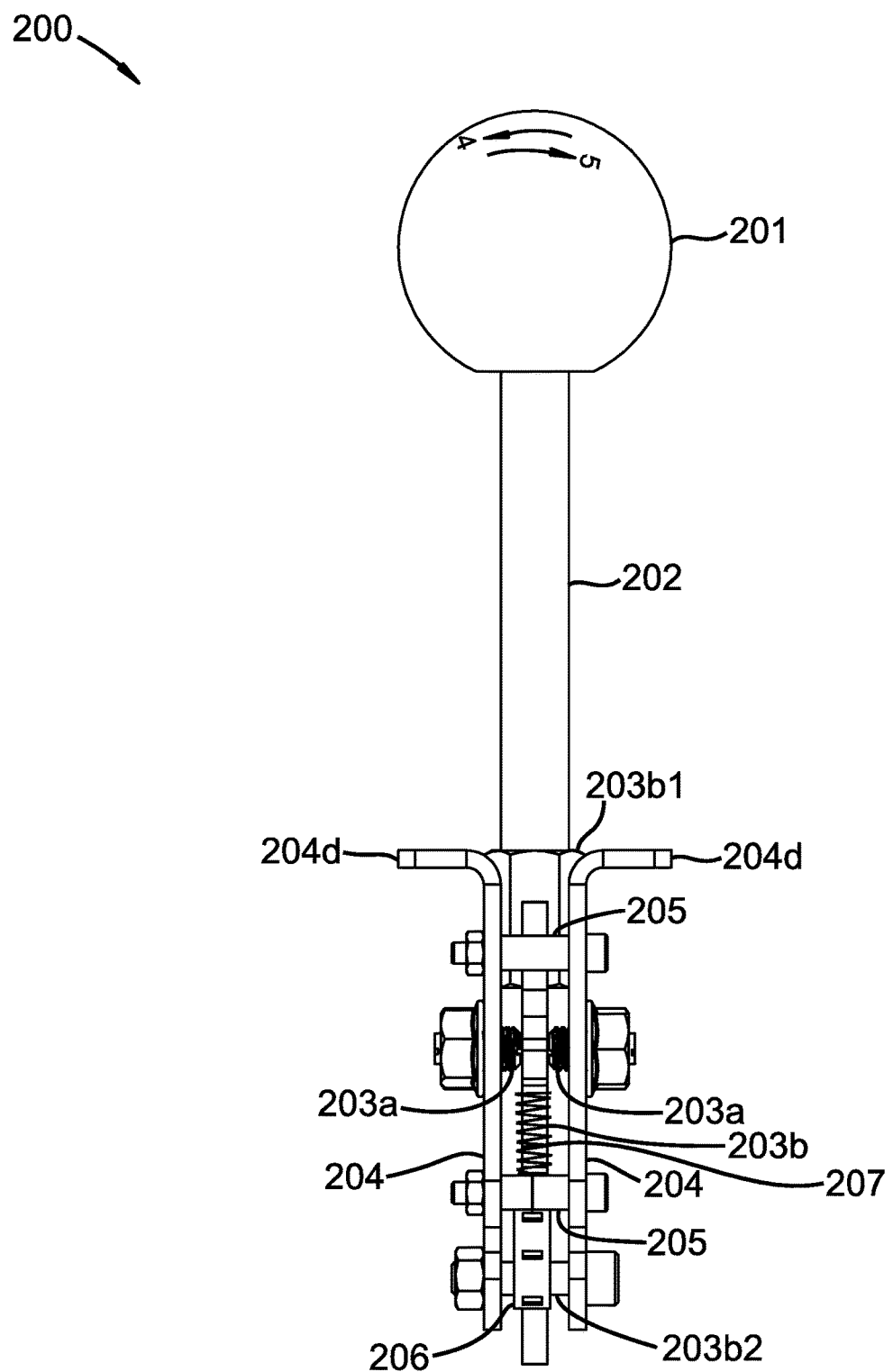
Figure 2C:
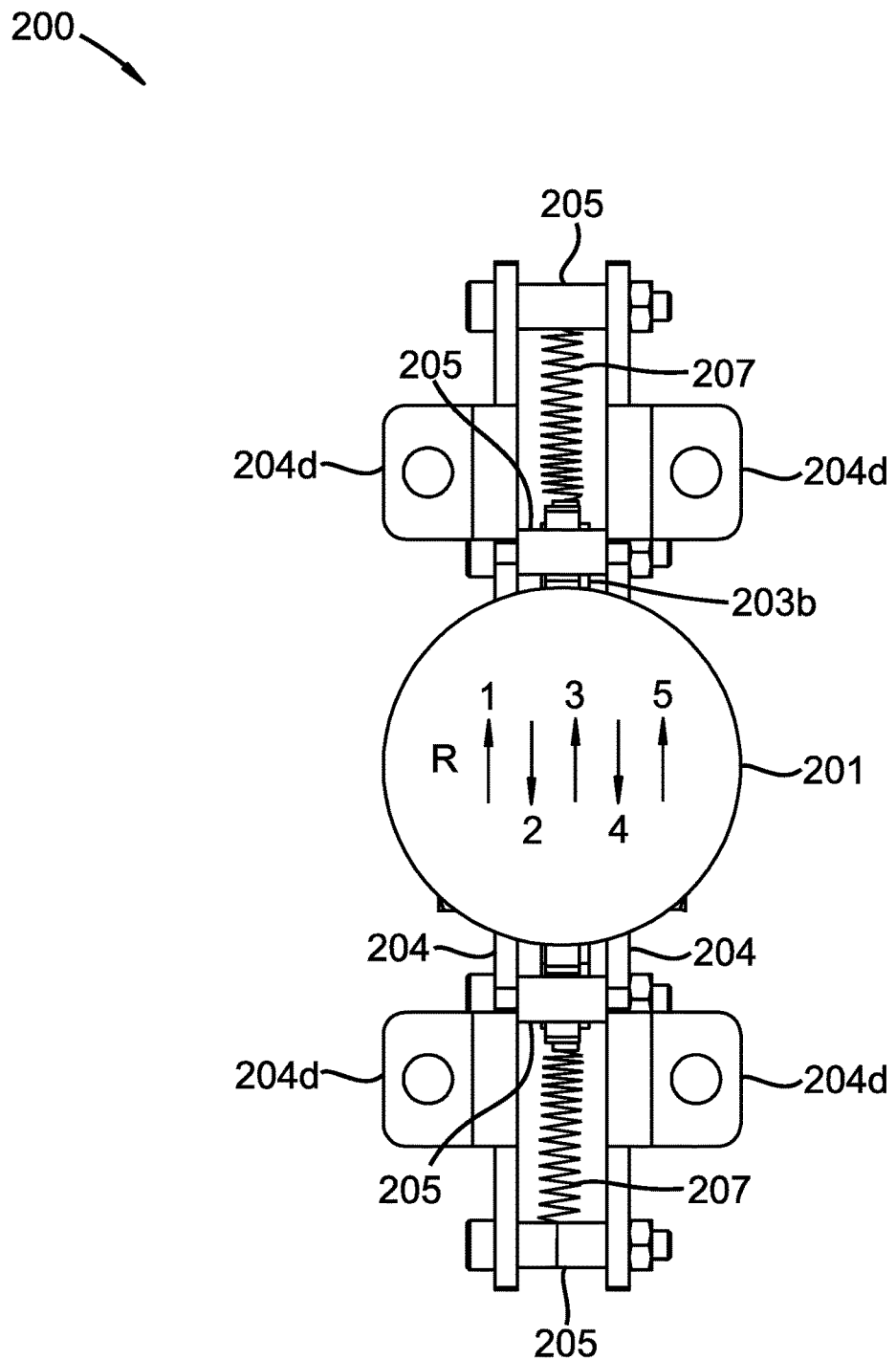
Figure 2D:
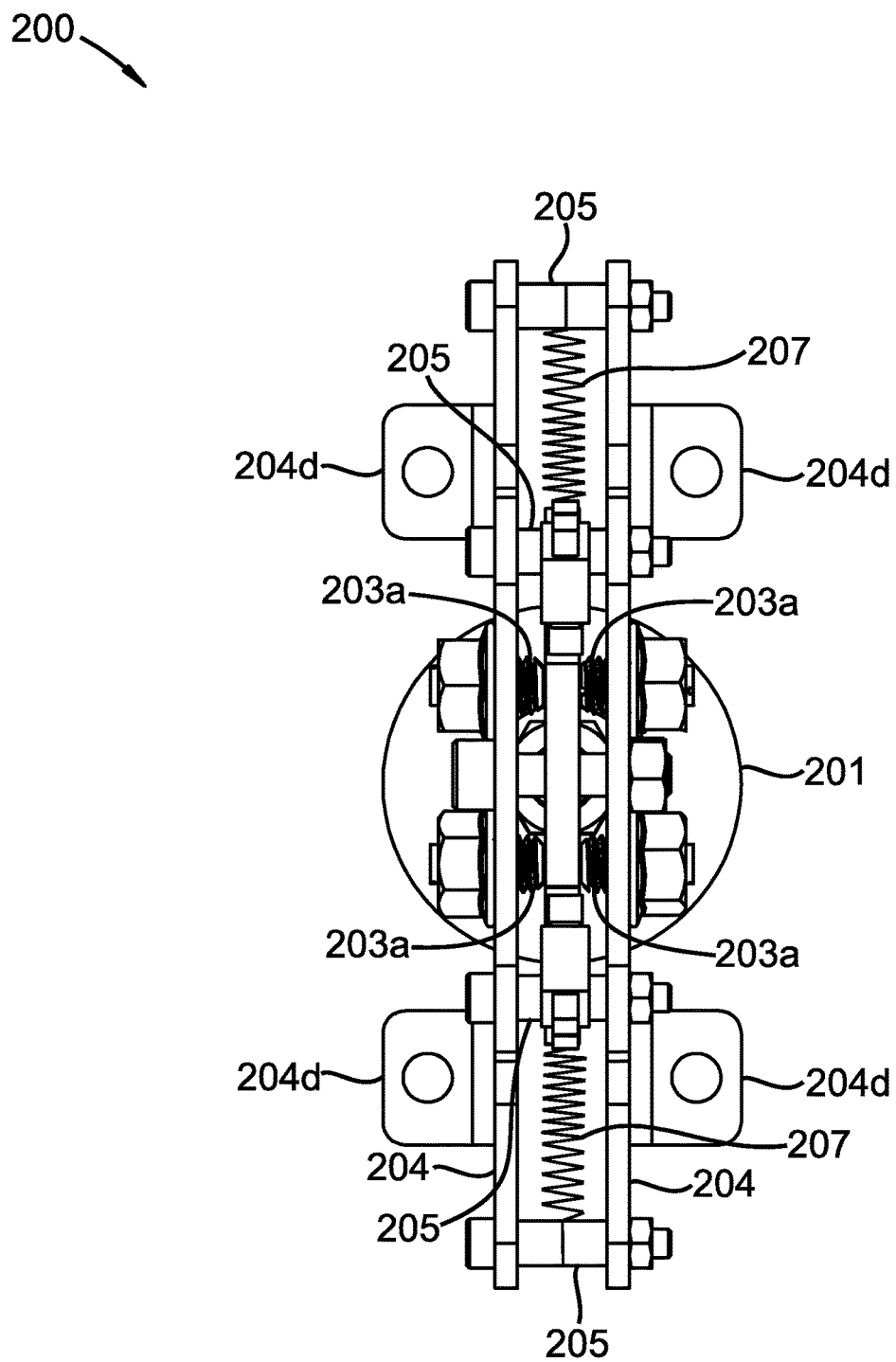
Figure 2E:
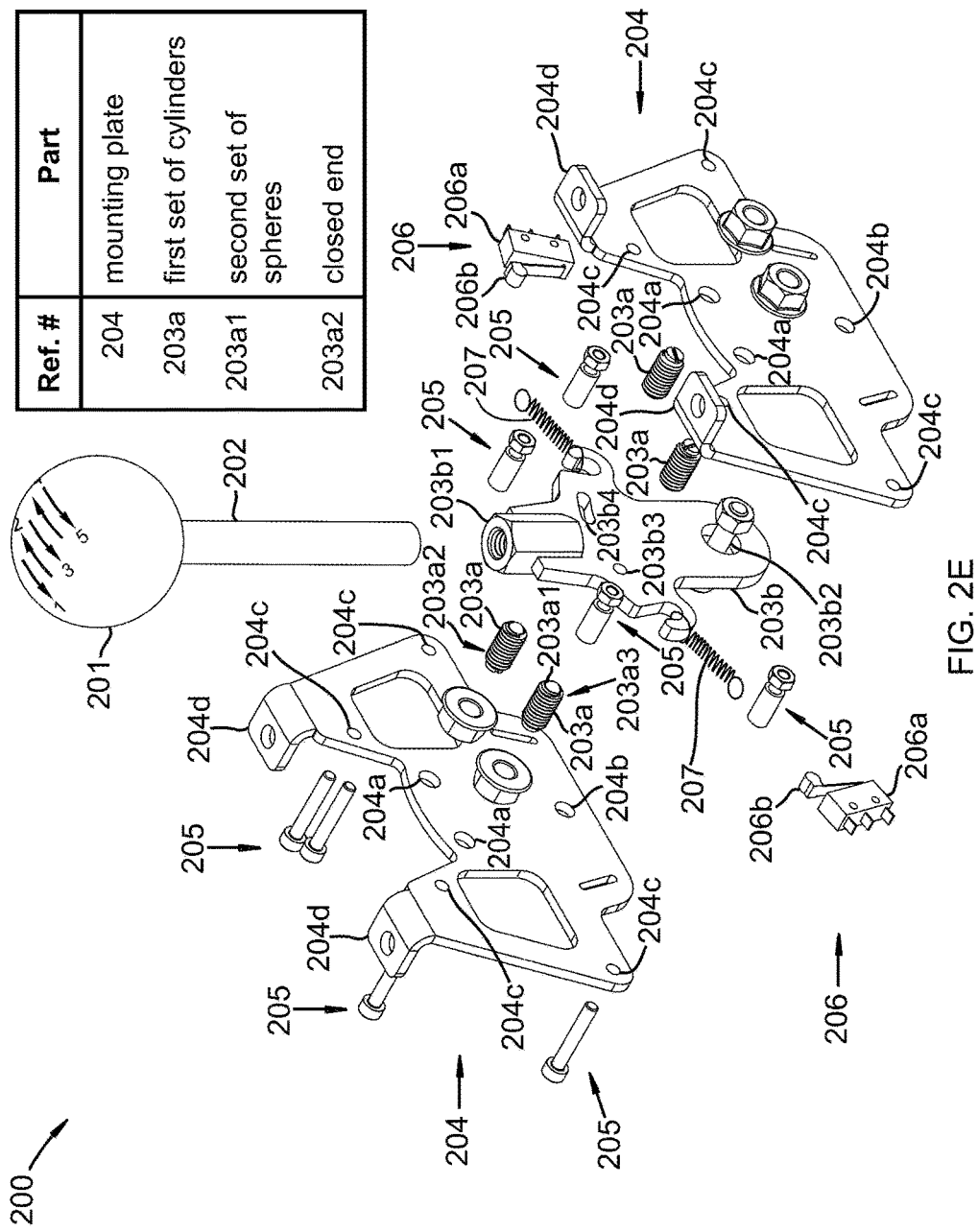

FIG. 1 depicts an embodiment of a vehicle incorporating an electronic shifter according to the present invention. As shown, vehicle 100 is a three-wheeled vehicle. Vehicle 100 includes electronic shifter 101 disposed outside of steering wheel 102 relative to passenger compartment 103, embodiments of which are described below in more detail. More specifically, shifter 101 is disposed along a top side of driver's-side sidewall 104. In another specific embodiment, shifter 101 is disposed in dashboard 105 between steering wheel 102 and sidewall 104. Those of skill in the art will recognize from this disclosure that shifter 101 can be placed in a variety of positions within vehicle 100. Thus, in some embodiments, shifter 101 is positioned inside of steering wheel 102 relative to passenger compartment 103, on dashboard 104, or on a floorboard (not shown, but similar to those known in the art).

Although the depicted embodiment is a three-wheeled vehicle, in some embodiments, vehicle 100 is a four-wheeled vehicle. In yet other embodiments, vehicle 100 is an aircraft. In some embodiments, vehicle 100 is even an amphibious vehicle or other type of watercraft.

FIGS. 2A-F depict various views of one embodiment of a manual-feel electronic shifter according to the claimed invention. Shifter 200 includes handle 201, shaft 202, tactile feedback mechanism 203, mounting plates 204, spacers 205, electronic switches 206, and equilibrium springs 207. Tactile feedback mechanism 203 includes externally threaded bored cylinders 203a and base plate 203b. Each mounting plate 204 includes cylinder openings 204a, pivot opening 204b, spacer openings 204c, and mounting brackets 204d. Additionally, each electronic switch 206 includes elongated body 206a and switch arm 206b.

Handle 201 and shaft 202 are made of any of a variety of materials. Shaft 202 couples handle 201 to tactile feedback mechanism 203, and handle 201 enables a user to manually grasp and actuate shifter 200. In some embodiments, handle 201 includes insignia 201a indicating a shift pattern to a user. In the depicted embodiment, insignia 201a indicates a shift pattern imitating a manual transmission shift pattern, where first, third, and fifth gears are straight up from a shifter equilibrium position, and second and fourth gears are straight down from the equilibrium position. In some embodiments, neutral engaged by a double-up shift and/or a double-down shift, such that actuating shifter 200 up and/or down twice in immediate succession shifts the transmission into neutral. In other embodiments, neutral is engaged by a shift upwards or downwards held for a fixed amount of time, such as longer than 1-2 seconds. Additionally, in some embodiments, reverse drive is engaged by a double-shift in the same direction from a specific gear, such as twice up from first. Though not shown, shifter 200 includes a controller communicating signals from switches 206 to the vehicle transmission to shift gears of the transmission in the indicated pattern. The controller stores instructions that include the shifting pattern as described above, or other similar patterns.

Different from a manual transmission, the equilibrium position is disposed between the up and down positions, similar to some manumatic (e.g., tiptronic, steptronic, shiftmatic) systems, where neutral is engaged by a specific shift pattern. Different from manumatic systems, though, shifter 200 is always in manual mode, without separate modes for park, reverse and neutral. The present inventors have found that previous automatic, manual, and manumatic transmission shifting systems cannot be modified to meet the functionality of the presently disclosed system because they lack all the functional elements, either alone or in combination, to imitate manual transmission tactile feedback. Thus the need for the claimed invention.

As depicted, tactile feedback mechanism 203 includes two sets of two cylinders 203a. Each cylinder 203a includes metal sphere 203a1, closed end 203a2, open end 203a3, and a spring (not shown). The spring is disposed in the cylinder between sphere 203a1 and closed end 203a2. Open end 203a3 has a diameter smaller than the diameter of sphere 203a1, and the spring is compressed between sphere 203a1 and closed end 203a2, forcing sphere 203a1 against open end 203a3. Cylinder 203a, metal sphere 203a1, and/or the spring are made of any of a variety of materials, including aluminum, steel, brass, other metal alloys, hardened molded plastic, and/or other suitable hardened plastics. The external threads on cylinder 203a secure cylinder 203a so that it can function as is described in more detail below. The threads allow cylinder 203a to be adjustable. However, cylinder 203a does not need to be adjustable to be functional. Thus, in some embodiments, cylinder 203a is externally smooth, and includes a fixing member, such as one or more flanges and/or pins. Similarly, though in the depicted embodiment metal sphere 203a1 is forced against open end 203a3 by the spring, in other embodiments, sphere 203a1 is forced against open end 203a3 pneumatically or hydraulically.

Base plate 203b is coupled to shaft 202, and includes elongated hexagonal nut 203b1, pivot rod 203b2, circular opening 203b3, and straight slot 203b4. As depicted, base plate 203b is made of laser-cut aluminum. However, base 203b is, in other embodiments, made of other materials, including metals and hardened plastics. Nut 203b1 is welded to base plate 203b between prongs 203b5 that extend from base plate 203b. However, in some embodiments, nut 203b is a molded, integral part of base plate 203b. As shown, nut 203b1 is internally threaded and is an intermediary between base plate 203b and shaft 202, such that shaft 202 screws in to nut 203b1. As depicted, nut 203b1 is externally hexagonal to aid in tightening shaft 202 to base plate 203b. However, in some embodiments, shaft 202 mounts to nut 203b1 in a variety of other ways. Alternatively, in some embodiments, shaft 202 and base plate 203b are monolithic, or shaft 202 is otherwise joined directly to base plate 203b without the intermediation of nut 203b1.

Pivot rod 203b2, which is disposed at an end of base plate 203b opposite nut 203b1, passes through base plate 203b, and base plate 203b rotates about pivot rod 203b2. Pivot rod 203b2 is made of any of a variety of materials similar to those listed above for base plate 203b, such as various metals, metal alloys, and hardened plastics. As shown, base plate 203b includes a pivot opening through which pivot rod 203b2 passes so that base plate 203b can rotate about pivot rod 203b2.

Opening 203b3 passes through base plate 203b, and has a diameter smaller than spheres 203a1. Two cylinders 203a, forming a first set, are disposed adjacent to opening 203b3 on opposite sides of opening 203b3 such that spheres 203a1 inside the first set rest inside opening 203b3 when base plate 203b is in the equilibrium position. Together, the first set of cylinders 203a and opening 203b3 form a first ball detent. The first detent resists rotation of base plate 203b from the equilibrium position, and rotation of base plate 203b away from the first detent causes a tactile "bump" or "pop" that imitates the tactile feedback of a manual transmission shifter as a gear is disengaged. Though in the depicted embodiment opening 203b3 is shown as passing through base plate 203b, in general, opening 203b3 is an inset circular feature in base plate 203b having a diameter smaller than the diameter of a corresponding sphere 203a1. The corresponding sphere 203a1 forms contact with an edge of the circular feature as the base is in the equilibrium position, and motion away from the equilibrium position causes the edge to force the sphere 203a1 against the spring into cylinder 203a. In some embodiments, the circular feature is a concave depression in base plate 203b. In the same and/or other embodiments, the circular feature includes a raised edge around the depression that enhances the tactile feedback.

Slot 203b4 includes rounded ends and passes through base plate 203b. Slot 203b4 and opening 203b3 are aligned tangentially to a circumference about pivot rod 203b2. Two cylinders 203a, forming a second set of cylinders, are disposed adjacent to slot 203b4 on opposite sides of slot 203b4 such that spheres 203a1 inside the second set of cylinders 203a1 rest inside slot 203b3 when base plate 203b is in the equilibrium position, and as the first set of spheres 203a1 move past opening 203b3. Slot 203a1 has a width smaller than the diameter of the corresponding spheres 203a1 and a length greater than the diameter of the corresponding spheres 203a1 and opening 203b3 such that, as base plate 203b moves past the first detent, the second set of spheres 203a1 slide in slot 203b4. In some embodiments the length of slot 203b4 ranges from more than once the diameter of the corresponding spheres 203a1 to five times the diameter of the corresponding spheres 203a1. The second set of cylinders 203a are disposed adjacent to, and centered over slot 203b4 such that the corresponding spheres 203a1 form contact with the top and bottom edges of slot 203b4 as the base is in the equilibrium position. Together, the second set of cylinders 203a and slot 203b4 form a second ball detent. The second detent resists rotation of base plate 203b away from the equilibrium position after base plate 203b moves past the first detent. Rotation of base plate 203b away from the second detent causes a tactile "bump" or "pop" that imitates the tactile feedback of a manual transmission shifter as a gear is engaged. Though in the depicted embodiment slot 203b4 is shown as passing through base plate 203b, in general, slot 203b4 is an inset, rounded slot feature in base plate 203b. The corresponding sphere 203a1 forms contact with the edge of the slot feature as the base is in the equilibrium position, and motion away from the equilibrium position causes the spheres 203a1 to slide in slot 203b4 until they meet, and move past, the rounded ends of slot 203b4. In some embodiments, the slot feature is a concave depression in base plate 203b. In the same and/or other embodiments, the slot feature includes a raised edge around the depression that enhances the tactile feedback.

Opening 203b3 and slot 203b4 are spaced apart along the circumference by, in the depicted embodiment, more than a distance equal to the length of slot 203b4. However, in some embodiments, the distance is approximately half the length of slot 203b4, and in other embodiments, the distance is greater than the length of slot 203b4. In some embodiments, opening 203b3 and slot 203b4 occupy positions on different circumferences about pivot rod 203b2. In such embodiments, it is important that slot 203b4 is at least three times the length of the diameter of opening 203b3, to ensure proper "feel" imitating manual transmission feedback. In one such embodiment, slot 203b4 has a length equal to four times the diameter of opening 203b3. The first and second set of cylinders 203a are aligned such that the second set is positioned over the lengthwise center of slot 203b4 as the first set is positioned over the center of opening 203b3. Rotation of base plate 203b about pivot rod 203b2 forces the first set of spheres 203a1 out of opening 203b3 and forces the second set of spheres 203a1 to slide along slot 203b4. Further rotation of base 203b about pivot rod 203b2 forces the second set of spheres 203a1 out of slot 203b4. As described above, forcing the first or second set of spheres 203a1 out of opening 203b3 or slot 203b4, respectively, creates a tactile feedback imitating manual transmission tactile feedback.

Mounting plates 204 are each disposed on an opposite side of base plate 203b from the other, and are each parallel to base plate 203b. Additionally, mounting plates 204 mount shifter 200 above, below, or through a vehicle surface. In some embodiments, the alignment between mounting plates 204 and base plate 203b is a design choice; in others it is necessary to ensure proper mounting and function. For example, in the depicted embodiment, the parallel arrangement is space-saving, and allows for positioning of shifter 200 in places shifter 200 might otherwise not be suitable. The depicted embodiment shows two cylinder openings 204a that pass through each mounting plate 204. One cylinder 203a from the first set of cylinders 203a passes through one cylinder opening 204a, and one cylinder 203a from the second set of cylinders 203a passes through the other cylinder opening 204a. In some embodiments, such as that depicted, each cylinder 203a is forced against base plate 203b by a nut 204a1 disposed on a side of each mounting plate 204 opposite base plate 203b. However, in other embodiments, cylinder openings 204a are threaded. In other embodiments, cylinder openings 204a are excluded, and a first and second cylinder 203a form an integral part of each mounting plate 204.

Pivot rod 203b2 passes through pivot opening 204b in each mounting plate 204. As shown, pivot rod 203b2 is secured to mounting plates 204 by nuts. In some embodiments, bearings are also or alternatively included. Additionally, similar to cylinders 203a described above, in some embodiments, pivot rod 203b2 forms an integral part of mounting plates 204, and pivot opening 204b is excluded or completely filled by pivot rod 203b2.

Spacers 205 pass through four spacer openings 204c in each mounting plate 204. As shown, and similar to pivot rod 203b2, in some embodiments each spacer 205 is secured to each mounting plate 204 by a nut. In other embodiments, spacers 204 form an integral part of mounting plates 204. Spacers 205 are disposed between mounting plates 204 and prevent contact between base plate 203a and mounting plates 204, which is disposed between mounting plates 204. Other embodiments include more or fewer spacers. Additionally, in some embodiments, one or more of spacers 205 act as stoppers that prevent over-rotation of base plate 203b past the second detent. In the depicted embodiment, two spacers 205 are disposed between mounting plates 204, one in front of base plate 203b, and one behind base plate 203b, such that opposing edges of base plate 203b press against the stopper-spacers 205 to prevent over-rotation of base plate 203b.

Mounting brackets 204d are, in the depicted embodiment, disposed at an end of each mounting plate opposite pivot opening 204b, and are aligned perpendicular to base plate 203b. However, there are many variations of positioning and alignment of mounting brackets 204d on each mounting plate 204, each of which would satisfy various mounting conditions, and would be suitable for various mounting surfaces. For example, the depicted embodiment would be suitable for mounting shifter 200 in a vehicle dashboard, the shaft and handle extending from the dashboard.

Electronic switches 206 are disposed between, and mounted to, mounting plates 204. For example, in the depicted embodiment, there are two electronic switches 206, each slideably coupled to mounting plates 204 such that rotation of base plate 203b away from the equilibrium point in a first direction, such as forward, and past the second detent closes a forward switch 206, and such that rotation of base plate 203b away from the equilibrium point in a second direction, such as backwards, and past the second detent closes the other switch 206. As shown, pressure by base plate 203b against each switch 206 slides each to a stopping point. Switches 206 close at the stopping point, and the stopping point is positioned such that it is reached by switches 206 past the second detent, or after the second set of spheres 203a1 moves out of slot 203b4.

As mentioned above, each switch 206 includes elongated body 206a and arm 206b. Arm 206b extends away from body 206a at an intersecting angle with body 206a. Each switch 206 is positioned such that a corresponding edge of base plate 203b is parallel to body 206 as rotation of base plate 203b forces arm 206b parallel to body 206a and closes switch 206.

In the depicted embodiment, two equilibrium springs 207 are each coupled to, and between, at least one spacer 205 and hook 203b5 extending from base plate 203b. One spring 207 is disposed in front of base plate 203b, and one is behind base plate 203b, such that springs 207 return base plate 203b to the equilibrium position when base plate 203b is rotated in either direction about pivot rod 203b2. Each equilibrium spring 207 exerts a force on base plate 203b in the direction of the equilibrium position.

We claim:

1. An electronic gear shifter providing tactile feedback, comprising:
   a handle;
   one or more electronic switches that signal a vehicle transmission to shift gears; and
   a tactile feedback mechanism, comprising:
      a base coupled to the handle;
      a pivot through the base about which the base rotates;
      one or more springs coupled to the base that resist rotation of the base from, and return the base to, an equilibrium position;
      a first detent resisting rotation of the base from the equilibrium position, the first dent comprising:
         at least one bored cylinder having a closed end and an open end;
         a ball disposed in the cylinder having a diameter greater than a diameter of the open end;
         a spring disposed in the cylinder between the ball and the closed end; and
         an inset circular feature in the base having a diameter smaller than the diameter of the ball,
         wherein the cylinder is disposed adjacent to the base such that the ball forms contact with an edge of the circular feature as the base is in the equilibrium position; and
      a second detent resisting further rotation of the base past the first detent and away from the equilibrium position, the second dent comprising:
         at least one bored cylinder having a closed end and an open end;
         a ball disposed in the cylinder having a diameter greater than a diameter of the open end;
         a spring disposed in the cylinder between the ball and the closed end; and
         an inset slot in the base having a width smaller than the diameter of the ball and a length greater than the diameter of the ball,
         wherein the cylinder is disposed adjacent to, and centered over the base such that the ball forms contact with top and bottom edges of the slot as the base is in the equilibrium position, and
      wherein rotation of the base past the second detent closes one or more of the electronic switches, and wherein rotation of the base past the first and second detents provides manual transmission tactile feedback, and
      a controller communicating signals from the switches to a vehicle transmission to shift gears of the transmission, wherein the controller stores instructions that include a shifting pattern between the switches that provides a manual transmission shifting pattern.

2. The electronic gear shifter of claim 1, wherein the circular feature comprises a concave depression in the base.

3. The electronic gear shifter of claim 2, wherein the circular feature comprises a raised edge around the concave depression.

4. The electronic gear shifter of claim 1, wherein the circular feature comprises an opening passing through the base.

5. The electronic gear shifter of claim 4, wherein the first detent comprises two bored cylinders, each bored cylinder disposed adjacent to opposite ends of the circular opening.

6. The electronic gear shifter of claim 1, wherein the slot comprises a concave depression in the base.

7. The electronic gear shifter of claim 6, wherein the slot comprises a raised edge around the depression.

8. The electronic gear shifter of claim 1, wherein the slot comprises an opening passing through the base.

9. The electronic gear shifter of claim 8, wherein the second detent comprises two bored cylinders, each bored cylinder disposed adjacent to opposite ends of the opening.

10. The electronic gear shifter of claim 1, further comprising one or more mounting plates coupled to the base mounting the gear shifter to a vehicle surface.

11. The electronic gear shifter of claim 10, wherein the gear shifter is mounted on a dashboard of the vehicle between a steering wheel and a side wall closest to the steering wheel.

12. The electronic gear shifter of claim 10, wherein the base is disposed between two mounting plates spaced apart from the base and each other by one or more spacers.

13. The electronic gear shifter of claim 12, comprising two of the electronic switches slideably coupled to the mounting plates between the mounting plates such that rotation of the base away from the equilibrium point in a first direction and past the second detent closes one of the switches, and such that rotation of the base away from the equilibrium position in a second direction and past the second detent closes the other switch.

14. The electronic gear shifter of claim 13, wherein pressure by the base against one of the switches slides the switch to a stopping point, wherein the switch closes at the stopping point, and wherein the stopping point is positioned past the second detent.

15. The electronic gear shifter of claim 1, further comprising a stopper that prevents over-rotation of the base past the second detent.

16. The electronic gear shifter of claim 15, wherein the base is disposed between two mounting plates spaced apart from the base and each other by at least two spacers, wherein the stopper comprises opposing edges of the base and the spacers.

17. An electronic gear shifter providing tactile feedback, comprising:
   a handle;
   a shaft coupled to the handle;
   a tactile feedback mechanism, comprising:
      a first and a second set of two externally threaded and bored cylinders, each cylinder comprising:
         a metal sphere disposed in the cylinder;
         a closed end and an open end, the open end having a diameter smaller than the diameter of the sphere, and
         a spring disposed in the cylinder between the sphere and the closed end, forcing the sphere against the open end;
      a base plate coupled to the shaft, comprising:
         an elongated hexagonal nut welded to the base plate between two prongs extending from the base plate, wherein the shaft screws into the nut;
         a pivot rod passing through the base plate about which the base plate rotates, the pivot rod disposed at an end of the base plate opposite the nut;
         a circular opening passing through the base plate having a diameter smaller than each metal sphere, the first set of cylinders adjacent to the circular opening such that each metal sphere of the first set of cylinders rests inside the circular opening, the first set of cylinders disposed on opposite sides of the base plate, the first set of cylinders and the circular opening forming a first ball detent; and a straight slot with rounded ends passing through the base plate and aligned tangentially to a circumference about the pivot rod, the circular opening also aligned tangentially to the circumference, the spheres of the second set of cylinders adjacent to the straight slot such that the spheres of the second set of cylinders rest inside the straight slot, the second set of cylinders disposed on opposite sides of the base plate, the second set of cylinders and the straight slot forming a second ball detent, wherein the circular opening and the straight slot are spaced apart by more than a distance equal to the length of the straight slot, wherein the first and second sets of cylinders are aligned such that the second set of cylinders is positioned over a center of the straight slot as the first set of cylinders is positioned over a center of the circular opening, and wherein rotation of the base about the pivot rod forces the metal spheres of the first set of cylinders out of the circular opening and forces the metal spheres of the second set of cylinders to slide along the straight slot, and wherein further rotation of the base about the pivot rod forces the metal spheres of the second set of cylinders out of the straight slot, wherein forcing the metal spheres of the first or second set of cylinders out of the circular opening or the straight slot, respectively, creates a tactile feedback providing manual transmission tactile feedback;

two mounting plates, each mounting plate disposed on an opposite side of the base plate from the other, and each mounting plate parallel to the base plate, each mounting plate comprising:

two cylinder openings passing through the mounting plate, through which one of the cylinders of the first set of cylinders and one of the cylinders of the second set of cylinders passes, each cylinder of the first and second sets of cylinders forced against the base plate by a nut disposed on a side of the mounting plate opposite the base plate;

a pivot opening through which the pivot rod passes, the pivot rod secured to the mounting plate by a nut;

four spacer openings through which spacers pass, the spacers each secured to the mounting plate by a nut, wherein the spacers are disposed between the mounting plates and prevent contact between the base plate and the mounting plates; and two mounting brackets disposed at an end of the mounting plate opposite the pivot opening, the mounting brackets aligned perpendicular to the base plate;

two electronic switches disposed between, and mounted to, the mounting plates, one in front of the base plate and one behind the base plate, such that rotation of the base plate forward closes the front switch, and rotation of the base plate backwards closes the back switch, each switch comprising:

an elongated body; and an arm extending from the body at an intersecting angle with the body, wherein the switch closes as the arm is forced parallel to the body, and wherein each switch is positioned such that an edge of the base plate is parallel to the body as rotation of the base plate forces the arm parallel to the body and closes the switch; and two equilibrium springs, each coupled to a spacer and a hook extending from the base plate, one equilibrium spring in front of the base plate, and one equilibrium spring behind the base plate, wherein the equilibrium springs exert a force on the base plate in the direction of an equilibrium position as the base plate is rotated about the pivot rod, and wherein, at the equilibrium position, the first and second sets of cylinders are aligned such that the second set of cylinders is positioned over the center of the slot as the first set of cylinders is positioned over the center of the opening.

\* \* \* \* \*